(12) United States Patent
Boenkendorf et al.

(10) Patent No.: US 9,789,465 B2
(45) Date of Patent: Oct. 17, 2017

(54) GRANULAR MATERIAL FOR ABSORPTION OF HARMFUL GASES AND PROCESS FOR PRODUCTION THEREOF

(71) Applicant: FELS-WERKE GMBH, Goslar (DE)

(72) Inventors: Ulf Boenkendorf, Holle (DE); Thomas Stumpf, Bad Harzburg (DE); Christina Lange, Wernigerode (DE); Christine Mehling, Abbenrode (DE)

(73) Assignee: FELS-WERKE GMBH, Goslar (DE)

( * ) Notice: Subject to any disclaimer, the term of this patent is extended or adjusted under 35 U.S.C. 154(b) by 48 days.

(21) Appl. No.: 14/779,468

(22) PCT Filed: Mar. 28, 2014

(86) PCT No.: PCT/EP2014/056321
§ 371 (c)(1),
(2) Date: Sep. 23, 2015

(87) PCT Pub. No.: WO2014/154876
PCT Pub. Date: Oct. 2, 2014

(65) Prior Publication Data
US 2016/0030914 A1    Feb. 4, 2016

(30) Foreign Application Priority Data
Mar. 28, 2013   (DE) .......... 10 2013 005 497

(51) Int. Cl.
*B01J 20/04* (2006.01)
*B01D 53/50* (2006.01)
(Continued)

(52) U.S. Cl.
CPC .......... *B01J 20/043* (2013.01); *B01D 53/02* (2013.01); *B01D 53/508* (2013.01);
(Continued)

(58) Field of Classification Search
CPC .... B01D 53/02; B01D 53/508; B01D 53/685; B01J 20/043; B01J 20/041;
(Continued)

(56) References Cited

U.S. PATENT DOCUMENTS

| | | | |
|---|---|---|---|
| 5,502,021 A * | 3/1996 | Schuster | B01D 53/64 423/210 |
| 5,679,150 A | 10/1997 | Kerkar et al. | |
| 2012/0235086 A1* | 9/2012 | Schlicht | B01D 53/508 252/184 |

FOREIGN PATENT DOCUMENTS

| | | |
|---|---|---|
| CA | 2774942 A1 | 4/2011 |
| EP | 0487913 A1 | 6/1992 |

(Continued)

OTHER PUBLICATIONS

International Search Report of PCT/EP2014/056321 dated May 8, 2014.

*Primary Examiner* — Melvin C Mayes
*Assistant Examiner* — Michael Forrest
(74) *Attorney, Agent, or Firm* — Eric J. Sosenko; Jonathan P. O'Brien; Honigman Miller Schwartz and Cohn LLP (57) ABSTRACT

A granular sorption material including a plurality of porous granules formed by buildup agglomeration for separation, especially absorption, of harmful gases, especially of $SO_X$ and/or HCl, from offgases of thermal processes. The granules containing greater than 80% by weight, and preferably greater than 95% by weight, of $Ca(OH)_2$ and/or $CaCO_3$ based on the dry mass. The granules having a dry apparent density ρ, determined by means of an apparent density pycnometer, of 0.5 to 1.2 kg/dm³, preferably 0.7 to 1.1 kg/dm³, and/or a porosity of 45% to 73% by volume, preferably 55% to 65% by volume, and have especially been increased in porosity. A process for producing the granular
(Continued)

sorption material, in which pores are introduced into the granules by means of a porosity agent during the production.

40 Claims, 2 Drawing Sheets (51) Int. Cl.
 *B01J 20/28* (2006.01)
 *B01D 53/68* (2006.01)
 *B01J 20/30* (2006.01)
 *B01D 53/02* (2006.01)
(52) U.S. Cl.
 CPC .......... *B01D 53/685* (2013.01); *B01J 20/041* (2013.01); *B01J 20/28004* (2013.01); *B01J 20/28019* (2013.01); *B01J 20/28059* (2013.01); *B01J 20/305* (2013.01); *B01J 20/3028* (2013.01); *B01J 20/3064* (2013.01); *B01D 2251/404* (2013.01); *B01D 2251/604* (2013.01); *B01D 2251/606* (2013.01); *B01D 2253/30* (2013.01); *B01D 2253/304* (2013.01); *B01D 2257/2045* (2013.01); *B01D 2257/2047* (2013.01); *B01D 2257/302* (2013.01); *B01D 2258/0283* (2013.01)

(58) Field of Classification Search
 CPC ............ B01J 20/28004; B01J 20/28019; B01J 20/28059; B01J 20/3028; B01J 20/305; B01J 20/3064
 See application file for complete search history.

(56) References Cited

FOREIGN PATENT DOCUMENTS

| EP | 0748766 A1 | 12/1996 | | |
|----|----|----|----|----|
| JP | S6090862 A | 5/1985 | | |
| JP | 2002160918 A | * | 6/2002 | |
| RU | 2085262 C1 | 7/1997 | | |
| RU | 2342982 C2 | 8/2008 | | |
| WO | WO 2009/024105 A1 | * | 2/2009 | ............ C04B 28/02 |
| WO | 2011/039034 A1 | 4/2011 | | |
| WO | 2013/034314 A1 | 3/2013 | | |

* cited by examiner

GRANULAR MATERIAL FOR ABSORPTION OF HARMFUL GASES AND PROCESS FOR PRODUCTION THEREOF

CROSS-REFERENCE TO RELATED APPLICATION

This application is the U.S. national phase of PCT Application No. PCT/EP2014/056321 filed on Mar. 28, 2014, which claims priority to DE102013005497.4 filed on Mar. 28, 2013, the disclosures of which are incorporated in their entirety by reference herein.

TECHNICAL FIELD OF THE INVENTION

The present invention concerns a granular material made from buildup-agglomerated, porous granules for the separation, especially the absorption, of harmful gases, especially SOx, HCl and/or HF, as well as for the adsorption of other contaminants such as organic combustion residues from offgases of thermal processes, wherein the granules contain $CaCO_3$ and/or $Ca(OH)_2$ as active substance or absorption agent.

In the context of the present application, sorption means that particles build up on the outer or inner surface of a particle. By adsorption is meant that the particles are bound by mechanical or physical forces. On the other hand, the absorption of a particle to a particle occurs by a chemical bonding.

BACKGROUND

Offgases from thermal processes (=combustion gases) are the no longer usable gaseous and/or powderlike waste products arising during a combustion. Depending on the fuel, the offgases contain various portions of harmful components to man and the environment, such as sulfur oxides (SOx), hydrogen chloride (HCl), nitrogen oxides ($NO_x$) and/or dioxins. Consequently, an offgas cleaning is usually required for technical and industrial facilities. One generally distinguishes between dry and wet offgas cleaning methods.

In dry offgas cleaning methods the offgases are brought into contact with solids which react with the harmful components of the offgases. In this way, the harmful components are removed from the offgas. For example, one uses for desulphurization quicklime (CaO), hydrated lime ($Ca(OH)_2$) and/or limestone meal ($CaCO_3$). Limestone refers to sedimentary rocks which consist for the most part of calcium carbonate ($CaCO_3$) in the form of the minerals calcite and aragonite. Limestone meal is pulverized limestone. Quicklime is made by burning of limestone. Quicklime consists of calcium oxide (CaO), apart from slight impurities. Hydrated lime or also slaked lime arises under intense development of heat when quicklime is reacted with water. This is also called slaking. Hydrated lime is a bright powder or meal and consists of calcium hydroxide ($Ca(OH)_2$), apart from slight impurities. All these calcium compounds react with the $SO_2$ and $SO_3$ contained in the offgases to form essentially calcium sulfite ($CaSO_3$) or calcium sulfate ($CaSO_4$). The calcium sulfate is then separated in corresponding filters. It is basically known to blow powderlike or meal-like desulphurization agents, especially limestone meal, into the combustion chamber or the offgas flow.

Alternatively, the reaction occurs in a solids/offgas reactor downstream from the combustion, such as a packed bed filter, in which the offgas being cleaned flows through a loose granular layer of the sorption agent. The packed bed filter can be designed, e.g., as a solid bed absorber (with stationary fill), migrating bed absorber (with moving fill) or fluidized bed absorber (with formation of a fluidized bed). Packed bed filters are usually not operated with powderlike sorption agents, but instead with granular sorption materials, on account of excessively high pressure loss.

Buildup-agglomerated sorption granules made entirely of hydrated lime and/or limestone meal are known. Agglomeration is an umbrella term for methods of mechanical grain enlargement and it means the fusing and binding together of finely dispersed solid primary particles to form larger particle associations, the agglomerates. A distinction is drawn between pressing agglomeration and buildup agglomeration. In pressing agglomeration, external forces are exerted on the particles of a dry bed by pressing dies, so that many points of contact are formed with short contact distances. In buildup agglomeration, the individual primary particles or already formed small agglomerates are fused to each other by relative movement and wetting, optionally with an additional binding agent. Thanks to this relative movement, an interaction between binding forces and separating forces occurs. The separating forces arise from impact, shear, falling and friction stresses. Agglomeration occurs when the binding forces outweigh the others. One distinguishes four kinds of buildup agglomeration, namely, roll granulation, mix granulation, fluid bed granulation and granulation in liquids.

In buildup granulation with moisture, the individual primary particles, especially the hydrated lime granules, join together tightly with the moisture. This produces a very dense, nearly closed framework. As a result, the molecules of harmful gas can only penetrate with difficulty into the interior of the known sorption granules. In particular, it has been found that $SO_x$ are only absorbed in shell-like manner, in a relatively thin outer shell region, forming calcium sulfate ($CaSO_4$). The $Ca(OH)_2$ remains unused by up to 40 wt. %, for example, inside the known granules. Apparently the diffusion of the $SO_x$ gas is further impeded by the formation of calcium sulfate in the outer shell region.

Another mineral gas absorption granular material is known from DE 10 2009 045 278 A1. This comprises calcium-based porous granules, having a core containing at least 80 wt. % of calcium carbonate ($CaCO_3$) and at least one agglomeration layer enclosing the core and containing calcium hydroxide ($Ca(OH)_2$). The granules have a portion of calcium hydroxide of at least 60 wt. % in relation to the entire dry mass of the granules, as well as an essentially spherical shape and a BET surface of at least 8 $m^2/g$. The granules according to one preferred embodiment should have micropores with pore diameters of less than 100 µm, mesopores with pore diameters of 100 to 500 µm and/or macropores with pore diameters above 500 µm. The mineral desulphurization agent of DE 10 2009 045 278 A1 is produced by means of buildup agglomeration by placing a mixed product comprising at least calcium hydroxide in the form of powder and a mother grain containing at least 80 wt. % of calcium carbonate, and water in a granulation or pelletizing mixer, producing granules by granulation, and drying the granules so produced.

In the context of the present invention, however, it has been discovered that the high water content and the porosity of the granules known from DE 10 2009 045 278 A1 likewise do not produce the expected high SOx separation performance. As in the case of the hydrated lime granules without "mother grain", an outer shell absorption region is formed, hindering the separation process, while relatively much unconsumed or unused hydrated lime is still present inside the granules. Apparently the water adsorbed at room temperature is not available in the granules to promote a reaction at higher temperatures where the absorption processes and offgas cleaning take place. These high temperatures are known to be generated by offgas temperatures between, for example, 100 and 900° C. There also appears to occur here a kind of clogging due to formation of calcium sulfate in the outer peripheral regions of the granules, in addition to the formation of a diffusion-tight shell due to the production technology, so that the further penetration of gas into the granules is hindered.

In order to prevent this, it is proposed in DE 10 2011 112 657 A1 to use buildup-agglomerated granules having, besides hydrated lime and/or limestone meal, a capillary water storing light aggregate meal and an adsorbed water content between 2 and 30 wt. % in terms of the total of the components of the calcium compound, the light aggregate, and the water. Light aggregates possess the ability to store capillary water such that water is available in sufficient amount in the granules even at higher temperatures, such as occur for example in offgas cleaning plants downstream from combustion layouts. This is supposed to favor the reaction between the $SO_x$ gases and the hydrated lime meal grains and/or the limestone meal grains in that water is available on the surface of the meal grains for the dissolving of SOx gases and the formation of calcium sulfate can occur from the solution. In any case, the water storing light aggregate brings about a boosting of the degree of separation of the $SO_x$ gases. Furthermore, it has the effect that almost the entire $Ca(OH)_2$ or the entire $CaCO_3$ of a granule can react with the SOx gas to form calcium sulfate, without the outer reaction layers blocking the progress of the reaction. A "clogging" such as occurs with the known granules of similar makeup but without light aggregate is largely prevented according to DE 10 2011 112 657 A1.

A granular sorption material is known from DE 10 2011 113 034 A1, whose granules are shaped bodies made in a pressing process. The granules have hydrated lime and/or limestone meal as the SOx absorption agent and in addition a finely divided, shredded cellulose fiber material. Furthermore, the granules have an adsorbed water content of up to 30 wt. % in terms of the quantity of $SO_x$ absorption agent and shredded material. The shredded cellulose fiber material increases the porosity or capillarity of the granules, which improves the diffusion of the harmful gases into the granules. Furthermore, a water reservoir is also created, thereby increasing the separation performance.

The granular sorption materials known from DE 10 2011 112 657 A1 and DE 10 2011 113 034 A1 have proven to work well.

SUMMARY OF THE INVENTION

The problem which the present invention proposes to solve is to provide an alternative granular sorption material from buildup-agglomerated granules having at least one $SO_x$-absorbing calcium compound in which the absorption progress into the interior is not hindered by a shell formation and which assure a high degree of SOx separation.

Another problem is the providing of a method for the production of such a granular sorption material.

These problems are solved by a granular sorption material with the features of claim 1, 2 and 3 as well as a method according to claim 19.

BRIEF DESCRIPTION OF THE DRAWINGS

In the following, the invention will be explained more closely with the help of a drawing as an example. There are shown.

DETAILED DESCRIPTION

According to a first embodiment of the invention (FIG. 1), the granular sorption material according to the invention consists of a plurality of buildup-agglomerated, coreless granules 1. The coreless, uniform or monolithic granules 1 in familiar fashion have a cluster 2 of primary particles 3 agglomerated together (shown schematically as points in the figures). Monolithic in the sense of the invention means that the granules 1 have a homogeneous structure. Clusters in the sense of the invention are mixtures of solid particles which are loosely mingled or firmly joined to each other. The finely divided or finely dispersed primary particles 3 of the granules 1 according to the invention have a grain size ≤250 μm, preferably ≤90 μm. Thus, they are pulverized grains.

Figure 1:
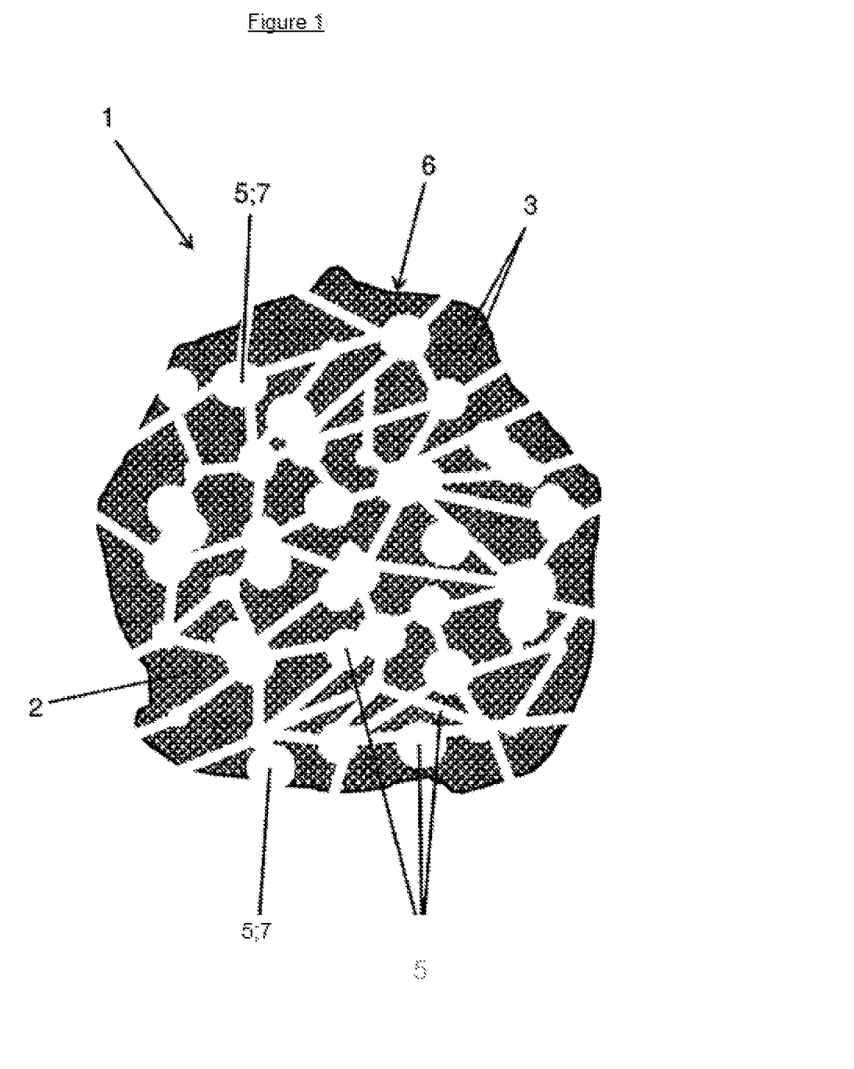
FIG. 1: schematically, a cross section of a granule of the granular sorption material according to the invention in a first embodiment of the invention.

The granules 1 contain, as their principal fraction in terms of weight, a SOx and HCl absorbing calcium compound in the form of $Ca(OH)_2$ and/or $CaCO_3$. That is, the amount of $Ca(OH)_2$ or $CaCO_3$ (if only one of the two components is present) or the sum of $Ca(OH)_2$ and $CaCO_3$ (if both components are present) is >50 wt. % in terms of the total solids fraction of the granules 1. Preferably, the granules each time contain at least 80 wt. %, preferably at least 90 wt. %, of $Ca(OH)_2$ and/or $CaCO_3$, in terms of the total solids fraction of the granules 1. Consequently, a principal fraction (>50 wt. %) of the primary particles 3 consists of $Ca(OH)_2$ and/or $CaCO_3$. In particular, the primary particles 3 are chiefly (>50 wt. %) limestone meal grains and/or hydrated lime meal grains, in terms of the total fraction of primary particles 3.

According to the invention, the coreless granules 1 furthermore each have an open pore system 4 of interconnected gas pores or air pores 5 filled with gas, especially air. The open pore system 4 is furthermore in communication with the outside through many of the air pores 5, which emerge into the open on a grain outer surface or outer grain surface 6. The pore system 4 is thus open to the outside. The open pore system 4 thus interpenetrates the entire granule 1, especially its cluster 2.

Some of the air pores 5 according to the invention are pores 7 which have been created during the granulation process by means of a porosity agent. The granules 1 are thus made porous. The open pore system 4 according to the invention thus has air pores or gas pores 7 which were created during the granulation process by means of a porosity agent. These pores 7 result from the adding of a blowing agent, such as aluminum powder and/or aluminum paste, and/or an air entraining agent and/or a ready prepared foam to the fresh mixture or fresh mass during the granulation. It has been found, surprisingly, in the course of the invention that the pores 7 created by means of the porosity agent remain intact at least for the most part during the buildup agglomeration. In particular, while they are partly fragmented or disrupted, in any case they increase the open porosity of the granules 1 which is important to the gas absorption. This was not to be expected. In particular, the adding of a porosity agent appeared counter-intuitive.

Thanks to the additional pores 7 created by means of the porosity agent, the granules 1 of the granular sorption material according to the invention have very large open porosity. The granules 1 made porous according to the invention are thus open to diffusion, so that the harmful gas being absorbed can penetrate almost without hindrance into the granules and no unwanted shell formation occurs. Of course, the overall porosity results not only from the pores 7 created by means of the porosity agent. Because the granules 1 furthermore also have cluster pores in familiar fashion, which are present between the individual primary particles 3. Moreover, compacting pores and/or evaporation pores are also present in familiar fashion.

The pores 7 created by means of a porosity agent often have a nearly spherical shape or sphere shape. Moreover, at least some of them are macropores with a pore size >50 μm. Thus, it is distinctly evident from the finished granule 1 that it has pores 7 created by means of a porosity agent. Some of the pores 7 can also be tubular in shape.

An additional potential of the pores 7 created by means of a porosity agent which can be utilized is their water storage capacity. It is presumed that the pores 7 according to the invention also serve to interrupt the capillary pore system of the granules 1. At least it has been discovered in the course of the invention that capillary water bound in the granules 1 is better retained and can still be made available for the reaction even at high temperatures. This is known to favor the reaction between the $SO_x$ containing offgas and the limestone meal or the hydrated lime, since water for dissolving of SOx is present on the surface of the limestone meal grains or the hydrated lime meal grains and the formation of calcium sulfate occurs from the solution. This likewise improves the separation performance of the granular sorption material according to the invention. The water content of the granular sorption material according to the invention in particular amounts to 0.5 to 10 wt. %, preferably 1 to 5 wt. %, as determined by DIN EN 459-2.

The porosity, as is known, indicates the ratio of the volume of voids to the total volume and is thus a dimensionless quantity. The porosity is calculated by $$\phi = \left(1 - \frac{\rho}{\rho o}\right) \times 100\%$$

from the specific density $\rho_0$ and the dry apparent density $\rho$.

Preferably, the granules 1 of the granular sorption material according to the invention, especially when they consist by >80 wt. %, preferably >95 wt. %, of $Ca(OH)_2$ and/or $CaCO_3$, have a dry apparent density $\rho$ of 0.5 to 1.2 kg/dm³, preferably 0.7 to 1.1 kg/dm³. That is, the low dry apparent density $\rho$ is accomplished according to the invention even without or with only slight addition of other porous primary particles, such as CSH pulverized grains. The specific density $\rho_0$ of these granules 1, which is independent of the porosity, is advantageously 2.0 to 2.8 kg/dm³, especially 2.0 to 2.4 kg/dm³, preferably 2.1 to 2.3 kg/dm³. For the determination of the apparent density $\rho$ one will preferably use the apparent density pycnometer GeoPyc from Micromeritics. In this case, a glass cylinder is filled with DryFlo™, a fine-sand mixture of Teflon beads and some graphite as lubricant, which behaves similar to a liquid. The cylinder is clamped and the instrument determines, by pushing forward the cylinder piston with simultaneous vibration/rotation of the cylinder, the volume of the DryFlo™ mixture. The specimen is then placed in the cylinder, so that it is submerged in the DryFlo™ mixture and the volume is determined in the same way for the mixture of DryFlo™ and specimen. Since DryFlo™ does not penetrate into the pores. one gets the total volume of the specimen (i.e., including pore space) and from this the dry apparent density. The specific density $\rho_0$ is determined with a helium pycnometer, especially the helium pycnometer accupyc of the Micromeritics company. When determining the specific density $\rho_0$ by means of helium pycnometer, two specimen containers whose volumes are exactly known are connected together across a valve. One of the containers is filled with the specimen and then evacuated. The second container is filled with helium at a predetermined pressure. By opening the valve, the pressure is equalized. From the final pressure, one can determine the volume occupied by the specimen. And from the volume and the previously determined weight, the specific density is calculated. The calculation of the densities is done on dried specimens. For this, similar to the determination of the moisture content of hydrated lime per DIN EN 459-2:2010-12, the specimens have been dried at 105° C. in a drying cabinet until the weight is constant.

The porosity of the granules 1 according to the invention as determined from the apparent and specific density, especially when they consist by >80 wt. %, preferably >95 wt. %, of $Ca(OH)_2$ and/or $CaCO_3$, is advantageously 45 to 73 vol. %, preferably 55 to 65 vol. %.

Based on the high fraction of pores 5;7, the granular sorption material according to the invention has a very slight bulk density. The bulk density of the granular sorption material according to the invention is advantageously 0.5 to 0.9 kg/dm³, preferably 0.5 to 0.8 kg/dm³. Despite the pores 5;7, the grain strength and abrasion resistance are very good. The granular sorption material according to the invention preferably has an abrasion resistance of <5 wt. %, preferably <2 wt. %, determined by means of abrasion tester of the Erweka company. The specific surface of the granular sorption material according to the invention measured according to BET is advantageously 10 to 60 m²/g, preferably 20 to 45 m²/g.

Furthermore, the granular sorption material according to the invention advantageously has a grain size distribution of 1 to 20 mm, preferably of 2 to 10 mm, especially preferably of 2 to 6 mm.

Advantageously, moreover, the granules 1 have at least one binding agent, especially a film-forming one, especially starch and/or methylcellulose and/or carboxymethylcellulose and/or glucose and/or lignin and/or alginate and/or clay minerals, preferably bentonite. The binding agent creates an adhesive force between the individual primary particles 3 of the cluster 2. Consequently, the binding agent serves to solidify the granules and to boost the grain strength and abrasion resistance of the granules 1 according to the invention. Furthermore, it stabilizes the pores 5;7.

Furthermore, it is of course within the scope of the invention for the granules 1 to contain other desulphurization agents, such as dolomite hydrate (($Ca(OH)_2.MgO$ or ($Ca(OH)_2.Mg(OH)_2$)) and/or dolomite meal (($Ca,Mg)CO_3$)) and/or sodium hydrogen carbonate ($NaHCO_3$) and/or soda ($Na_2CO_3$). Additional adsorption and/or absorption agents, including those for other harmful gases, can also be present, such as zeolites and/or activated charcoal and/or activated coke and/or laminar silicates. In this way, other pollutants such as mercury can be removed from the offgases being cleaned. The additional adsorption and absorption agents likewise form part of the primary particles 3 of the cluster 2.

Of course, the granules 1 moreover can also contain other known additives which improve the separation performance, especially compounds of the alkaline metals. For example, the granules can contain one or more of the following alkaline metals: sodium chloride, sodium hydroxide, sodium nitrate, sodium phosphate, sodium bromide, potassium chloride, potassium hydroxide, potassium hydrogen carbonate, potassium carbonate, potassium nitrate, potassium phosphate or potassium bromide. Preferred amounts of the bound alkaline metals are 0.5 to 5 mol % in terms of the dry substance of limestone and/or hydrated lime.

Furthermore, the granules 1 can also contain additionally pulverized grains of a porous mineral product, such as fine-grained aerated concrete according to DE 10 2011 112 657 A1 or materials with slight specific density. The granules 1 can also have finely divided, shredded cellulose material according to DE 10 2011 113 034 A1. Both of these further improve the diffusion of the harmful gas into the interior of the granules 1. Both the porous pulverized grains and the shredded cellulose material likewise form primary particles 3 of the cluster 2.

The granular sorption material according to the invention advantageously contains as its main fraction (wt. %), in terms of the total solids fraction, hydrated lime and/or limestone meal. In particular, the granular gas absorption material according to the invention has >50 to 99.9 wt. %, preferably >80 wt. %, especially >95 wt. % of hydrated lime and/or limestone meal, in terms of the total solids fraction.

Figure 2:
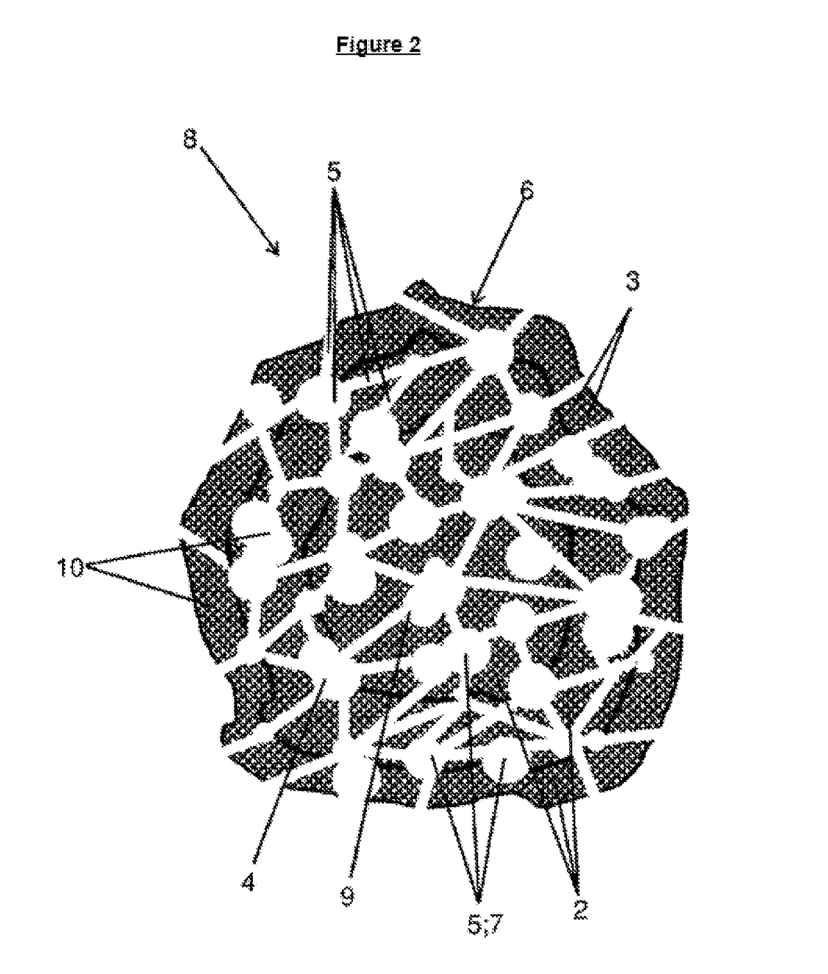
FIG. 2: schematically, a cross section of a granule of the granular sorption material according to the invention in another embodiment of the invention

According to a second embodiment of the invention, the granular sorption material according to the invention has multilayered granules 8 (FIG. 2). The granular sorption material can have both the coreless granules 1 and the multilayered granules 8 or only one kind. The multilayered granules 8 each have an inner mother grain or an inner core 9 and at least one, advantageously several agglomerate layers 10 arranged around the mother grain 9 and bordering on each other. Both the mother grain 9 and the agglomerate layers 10 are composed analogously to a coreless granule 1. That is, the agglomerate layers 10 and the mother grain 9 each have a cluster 2 of primary particles 3 agglomerated to each other, being principally limestone meal grains and/or hydrated pulverized lime grains. Moreover, the pores 5;7 according to the invention are present between the primary particles 3, so that the multilayered granules 9 also have the open pore system 4. That is, the pores 5;7 of the individual agglomerate layers 10 and of the mother grain 9 are likewise interconnected. Furthermore, the agglomerate layers 10 and the mother grain 9 can contain, as described above, at least one binding agent, additional adsorption/absorption agents, especially desulphurization agents, and/or additives. For example, the individual agglomerate layers 10 and the mother grain 9 can be different in terms of the content or fraction of the individual components. The agglomerate layers 10 and the mother grain 9 in this case have different material compositions.

The above indicated values in terms of the bulk density, the porosity, the water content, the grain strength, the specific surface, as well as the grain sizes of the granular sorption material according to the invention with the coreless granules 1 apply equally to the granular sorption material made from or with the granules 8 with mother grain 9.

In the following, the production of the granular sorption material according to the invention will now be explained:

The production is done, as already mentioned, by means of buildup agglomeration (moist granulation). For example, the production is done by means of roll agglomeration, such as in a plate granulator (also known as a pelletizer plate), a granulating cone or a granulating drum, or by mix granulation in a granulating mixer or by means of fluid bed or fluidized bed granulation.

The granular sorption material with the coreless granules 1 is produced by buildup agglomeration from a homogeneous fresh mass or a mixture containing at least one $SO_x$ absorbing calcium meal component (i.e., a meal containing $Ca(OH)_2$ and/or $CaCO_3$), such as limestone meal and/or hydrated lime and/or chalk and/or precipitated calcium carbonate and/or dolomite meal and/or dolomite hydrate, water, as well as at least one porosity agent. The porosity agent is a blowing agent and/or an air entraining agent and/or ready prepared foam. The production of the fresh mass can be done either by preparing a thin slurry or sludge, which is gradually brought to the desired consistency by adding the pulverized solids little by little. Alternatively, water is added little by little to a mixture of solids until the desired consistency is reached, so that granulation can be done.

It is of special benefit that the hydrated lime used must not—as required for example by the construction lime standard DIN EN 459-1:2010-12—have moisture (free water)<2%, but rather it can have production-dependent high moisture of up to 25 wt. %. Hydrates with specific production-related high moisture content can thus be put directly into the pelletizer, and the cost intensive drying process can be omitted.

A blowing agent or also gas forming agent in the sense of the invention reacts in alkaline medium to form gas. In particular, the blowing agent used according to the invention is aluminum (e.g., in the form of aluminum powder and/or paste) and/or zinc oxide and/or hydrogen peroxide. The blowing agent is preferably added to the slurry together with or shortly after the adding of the hydrated lime and/or limestone meal. Since the outgassing and thus the pore formation occurs at once, no waiting time is needed before granulation can be done. However, it is possible for gas formation to occur even during the granulation, until such time as all of the blowing agent has been reacted.

Air entraining agents in the sense of the invention are agents which introduce a certain amount of small, uniformly distributed, spherical air pores during the mixing process of the water-containing mixture. Air entraining agents are known as additives for concrete. The stabilization of the air pores in the water-containing mixture is done by adsorption on surfaces and reduction of the surface tension of the water. In the context of the invention, the air entraining agent used is preferably cocamide propyl betaine and/or sodium olefin sulfonate and/or sodium lauryl sulfate. The air entraining agent is preferably added likewise together with or shortly after the adding of hydrated lime or limestone meal to the slurry. The pore formation occurs in familiar manner upon mixing and is dependent on the mixing intensity.

For the adding of the ready prepared foam, at first a foam is produced with the help of a foaming device and a foaming agent with many uniformly divided spherical air pores. This ready prepared form is then added to the previously prepared fresh mass of limestone meal and/or hydrated lime and water and optionally other ingredients. In the context of the invention, polypeptide alkylene polyol and/or sodium olefin sulfonate and/or coco alkyl dimethyl aminoxide is used preferably as the foam concentrate.

In the preparation of the multilayered granules 8, at first the mother grains 9 are prepared by buildup granulation similar to what was described above. Next, the mother grains 9 are coated little by little in steps by means of buildup agglomeration with one or more agglomerate mixtures to form the agglomerate layers 10. The individual agglomerate mixtures likewise contain at least limestone meal and/or hydrated lime, water, as well as at least one porosity agent according to the invention.

After the granulation, the granules 1,8 are preferably dried.

In the following, preferred compositions of the dry mass for the preparation of the granular sorption material according to the invention, especially granular gas absorption material, are indicated. The individual ingredients can be combined with each other to make up 100 wt. %, while the binding agent and the additives are only preferably present:

|  |  | Content per total dry weight [wt. %] | preferably |
|---|---|---|---|
| Absorption agent | Hydrated lime and/or limestone meal | 80-99.9 | 95-99.9 |
| Porosity agent | Aluminum | 0.02-0.2 | 0.03-0.1 |
|  | Air entraining agent | 0.02-0.5 | 0.05-0.2 |
| Binding agent | Starch | <4 | <2 |
|  | Methylcellulose | <3 | <1 |
|  | Bentonite | <8 | <5 |
| Additive | Sodium carbonate | 0-5 |  |
|  | Potassium carbonate | 0-5 |  |
|  | Sodium hydroxide | 0-3 |  |

Sample Embodiment

From the following composition a fresh mass was prepared and a granular material of coreless granules was produced by buildup agglomeration. The air entraining agent was added together with the hydrated lime to the slurry. The water content of the fresh mass, in terms of total mass, was 33 wt. %:

| Hydrated lime | 99.3 wt. % |
|---|---|
| Starch (starch ether) | 0.6 wt. % |
| Air entraining agent (sodium lauryl sulfate) | 0.1 wt. % |

The resulting granular material had a very high open porosity and therefore excellent properties in regard to absorption of $SO_x$.

As already explained, it was discovered surprisingly in the course of the invention that it is possible to add porosity agents to the fresh mass or mixture for the buildup agglomeration and thereby produce an open pore system in the granules. In particular, it is surprising that the pores generated are not destroyed during the granulation and remain stable even after the drying. In particular, the air entraining agent seems to stabilize all pores of the open pore system. Thanks to the resulting interconnected pores, the granules according to the invention have low dry apparent density with high $Ca(OH)_2$ and/or $CaCO_3$ content of >80 wt. %, preferably >95 wt. % and are open to diffusion. The harmful gas being absorbed can penetrate into the interior of the granules and the unwanted shell formation is prevented. This leads to a very high separation performance of the granular gas absorption material according to the invention. Of course, it is also within the scope of the invention for the granules to contain closed pores. But their fraction is small.

But the pores apparently also interrupt the capillary pore system of the granules. Thanks to this, the capillary water bound in the granules is better retained and is available for the reaction even at high temperatures. This also favors the reaction between the $SO_x$ containing offgases and the $CaCO_3$ and $Ca(OH)_2$ and further improves the separation performance of the granular gas absorption material according to the invention.

Of further advantage to the granular sorption material according to the invention is the catalytic action of lime in the breaking down of organic compounds. This has a positive influence on the reducing of harmful organic hydrocarbons in the smoke gas.

It is also within the scope of the invention that not all agglomerate layers of the multilayered granules have the pores generated according to the invention, although this is preferable. Neither does the mother grain absolutely have to have the pores. But according to the invention at least one of the agglomerate layers or the mother grain has the pores, in order to ensure the diffusion of the harmful gases through the multilayered granules. The other agglomerate layers or the mother grain then have porous CSH meal grains, for example, so that the open porosity of the granules is preserved.

As already mentioned in the course of the production, it is within the scope of the invention to use, instead of limestone meal or hydrated lime or additionally, as $Ca(OH)_2$ and/or $CaCO_3$ containing desulphurization agent or $Ca(OH)_2$ and/or $CaCO_3$ containing $SO_x$ absorbing agent, respectively precipitated calcium carbonate (PCC) and/or precipitated calcium magnesium carbonate and/or chalk and/or dolomite meal and/or dolomite hydrate (slaked dolomite). PCC (precipitated calcium carbonate) is synthetic or synthetically produced calcium carbonate ($CaCO_3$). PCC is also known as precipitated calcium carbonate. In contrast with this, GCC (ground calcium carbonate) is ground calcium carbonate of natural origin (=limestone meal). The production of PCC is done by reacting carbon dioxide with milk of lime. The milk of lime is produced either by slaking of quicklime or by dispersing of calcium hydroxide in water. Calcium magnesium carbonate is produced accordingly.

The invention claimed is:

1. A granular sorption material comprising a plurality of buildup-agglomerated, porous granules for separation of harmful gases from offgases of thermal processes, the granules containing greater than 80% by weight of $Ca(OH)_2$ and/or $CaCO_3$ based on the dry mass, the granules having a dry apparent density $\rho$, determined by means of an apparent density pycnometer, of 0.5 to 1.2 $kg/dm^3$.

2. The granular sorption material according to claim 1, wherein the granular sorption material has a water content of 0.5 to 10 wt. % as determined by DIN EN 459-2.

3. The granular sorption material according to claim 1, wherein the granular sorption material has a specific surface, measured by BET, of 10 to 60 $m^2/g$.

4. The granular sorption material according to claim 1, wherein the granular sorption material has a grain size distribution of 1 to 20 mm.

5. Use of the granular sorption material according to claim 1, comprising the steps of providing the granular sorption material in offgasses of a thermal process and removing at least one of SOx and HCl and HF from the offgases of the thermal process.

6. The use of the granular sorption material according to claim 5, further comprising the step of conducting the thermal process in a solids/offgas reactor.

7. The granular sorption material according to claim 1, wherein the granules have an increased porosity relative to porosity of pre-buildup-agglomerated granules.

8. The granular sorption material according to claim 1, wherein the granules having a dry apparent density $\rho$, determined by means of an apparent density pycnometer, of 0.7 to 1.1 $kg/dm^3$.

9. A granular sorption material comprising a plurality of buildup-agglomerated, porous granules for separation of harmful gases from offgases of thermal processes, the granules containing greater than 80% by weight of $Ca(OH)_2$ and/or $CaCO_3$ based on the dry mass, the granules having a porosity, determined from a dry apparent density ρ, determined by means of an apparent density pycnometer, and a specific density $ρ_0$, determined with a helium pycnometer, of 45 to 73 vol. %.

10. The granular sorption material according to claim 9, wherein the granules have a porosity, determined from a dry apparent density ρ, determined by means of an apparent density pycnometer, and a specific density $ρ_0$, determined with a helium pycnometer, of 55 to 65 vol. %.

11. A granular sorption material comprising a plurality of buildup-agglormerated, porous granules for separation of harmful gases from offgases of thermal processes, wherein the granules contain $Ca(OH)_2$ and/or $CaCO_3$ as active substance, wherein the granules have an open pore system with pores created by means of a porosity agent during the production of the granular sorption material.

12. The granular sorption material according to claim 11, wherein the open pore system includes interconnected air pores, a portion of the air pores are the pores created by the porosity agent.

13. The granular sorption material according to claim 12, wherein at least some of the air pores emerge into the open on a grain outer surface of the granules, and wherein the open pore system is in communication with surroundings thereof via the air pores that emerge into the open.

14. The granular sorption material according to claim 11, wherein the granules contain primary particles which are agglomerated together.

15. The granular sorption material according claim 14, wherein the granules have a cluster of the primary particles which are agglomerated together, wherein the pore system interpenetrates the cluster.

16. The granular sorption material according claim 14, wherein the pores which are created by means of the porosity agent during the production of the granular sorption material are located between the primary particles.

17. The granular sorption material according to claim 11, wherein the granules contain greater than 50 wt. % of $Ca(OH)_2$ and/or $CaCO_3$, in terms of the total solids fraction of the granules.

18. The granular sorption material according to claim 11, wherein the granules have greater than 50 wt. % to 99.9 wt. % hydrated lime and/or limestone meal and/or precipitated calcium carbonate and/or chalk, in terms of the total solids fraction of the granules.

19. The granular sorption material according to claim 11, wherein the pores created by means of the porosity agent are in part nearly spherical or tubular.

20. The granular sorption material according to claim 11, wherein the granules have a dry apparent density ρ, as determined by means of apparent density pycnometer, 0.7 to 1.1 $kg/dm^3$.

21. The granular sorption material according to claim 20, wherein the granules have a specific density ρ0, as determined with a helium pycnometer, of 2.0 to 2.8 $kg/dm^3$.

22. The granular sorption material according to claim 21, wherein the granules have a porosity of 45 to 73 vol. %.

23. The granular sorption material according to claim 21, wherein the granules have a porosity of 55 to 65 vol. %.

24. The granular sorption material according to claim 11, wherein at least some of the granules are coreless.

25. The granular sorption material according to claim 11, wherein at least some of the granules are multilayered and have a mother grain and at least one agglomerate layer encasing the mother grain.

26. The granular sorption material according to claim 25, wherein at least the mother grain and/or one agglomerate layer has the pores created by means of a porosity agent.

27. A method for producing the granular sorption material according to claim 11, wherein the granular sorption material is formed by buildup agglomeration, and wherein pores are introduced into the granules by means of a porosity agent before and/or during buildup agglomeration.

28. The method according to claim 27, wherein the granules are produced by granulation from one or more fresh mass(es) each containing water and at least one meal component containing $Ca(OH)_2$ and/or $CaCO_3$, wherein the pores are introduced by means of the porosity agent into at least one of the fresh masses prior to granulation.

29. The method according to claim 27, wherein the porosity agent used is one of a blowing agent, an air entraining agent, and a ready prepared foam.

30. The method according to claim 29, wherein the blowing agent used is one of aluminum, zinc oxide and hydrogen peroxide.

31. The method according to claim 29, wherein the air entraining agent used is one of cocamide propyl betaine, sodium olefin sulfonate and sodium lauryl sulfonate.

32. The method according claim 27, wherein the granules are coreless and are prepared by means of buildup agglomeration from a homogeneous fresh mass, which contains at least one SOx absorbing Ca-component and water, and wherein the pores are introduced into the fresh mass by means of the porosity agent before and/or during the agglomeration.

33. The method according claim 32, wherein the SOx absorbing Ca-component used is one of limestone meal, hydrated lime, chalk meal, precipitated calcium carbonate, do-lomite meal and dolomite hydrate.

34. The method according to claim 27, wherein the multilayered granules are produced by means of stepwise buildup agglomeration from several fresh masses, each containing at least one SOx absorbing Ca-component and water, while at least one of the fresh masses contains the pores created by means of the porosity agent, wherein the pores are introduced into the at least one of the fresh masses by means of the porosity agent before and/or during the agglomeration.

35. The method according to claim 34, wherein mother grains are first created by means of buildup agglomeration from a first mixture containing water and then one or more agglomeration layers are applied to the mother grains by means of stepwise buildup agglomeration from other mixtures containing water.

36. The method according claim 27, wherein the granules contain primary particles which are agglomerated together and wherein the pores are introduced between the primary particles.

37. The granular sorption material according to claim 11, wherein the granules contain greater than 80 wt. % of $Ca(OH)_2$ and/or $CaCO_3$, in terms of the total solids fraction of the granules.

38. The granular sorption material according to claim 11, wherein the granules contain greater than 95 wt. % of $Ca(OH)_2$ and/or $CaCO_3$, in terms of the total solids fraction of the granules.

39. The granular sorption material according to claim 11, wherein the granules have greater than 80 wt. % hydrated lime and/or limestone meal and/or precipitated calcium carbonate and/or chalk, in terms of the total solids fraction of the granules.

40. The granular sorption material according to claim 11, wherein the granules have greater than 95 wt. % hydrated lime and/or limestone meal and/or precipitated calcium carbonate and/or chalk, in terms of the total solids fraction of the granules.

\* \* \* \* \*